United States Patent [19]

Smith

[11] Patent Number: 4,792,740

[45] Date of Patent: Dec. 20, 1988

[54] THREE-PHASE INDUCTION MOTOR WITH SINGLE PHASE POWER SUPPLY

[76] Inventor: Otto J. M. Smith, 612 Euclid Ave., Berkeley, Calif. 94708

[21] Appl. No.: 85,981

[22] Filed: Aug. 14, 1987

[51] Int. Cl.⁴ .............................................. H02P 7/48
[52] U.S. Cl. .................... 318/768; 318/767; 363/148
[58] Field of Search ............... 318/800, 816, 817, 768, 318/771, 780, 767, 769, 803, 749; 363/148-150

[56] References Cited

U.S. PATENT DOCUMENTS

| | | | |
|---|---|---|---|
| 1,912,207 | 1/1929 | Kennedy | 318/768 |
| 3,673,480 | 6/1972 | Johnstone | 318/768 |
| 4,060,754 | 11/1977 | Kirtley et al. | 318/218 |
| 4,465,962 | 8/1984 | Kirschbaum | 318/817 |
| 4,484,125 | 11/1984 | Hertz | 318/768 |
| 4,513,237 | 4/1985 | Ford | 318/768 |
| 4,618,809 | 10/1986 | Maeda | 318/768 |
| 4,745,348 | 5/1988 | Young | 318/749 |

OTHER PUBLICATIONS

"Current Techniques in Phase Conversion Systems", by Claude M. Hertz, Vice President-Engineering Ronk Electrical Industries, Inc., Presented at the IEEE 1978 Rural Electric Power Conference, Minneapolis, Minn., May 1-2, 1978.

*Primary Examiner*—William M. Shoop, Jr.
*Assistant Examiner*—Brian K. Young
*Attorney, Agent, or Firm*—Flehr, Hohbach, Test, Albritton & Herbert

[57] ABSTRACT

A three-phase induction motor is efficiently driven by a single phase power supply by, in one embodiment, splitting the three windings into six, connecting them in two symmetrical motors, with two of the winding pairs connected to each other. The resulting 4-terminal motor is placed across the single phase supply with appropriate capacitors providing balanced currents. For better efficiency, feedback control, along with transformers, may be used.

A similar feedback, transformer technique, may be used on a standard three terminal three-phase motor. Lastly, for such a motor, the foregoing techniques may be applied to a three wire residential power supply.

44 Claims, 13 Drawing Sheets

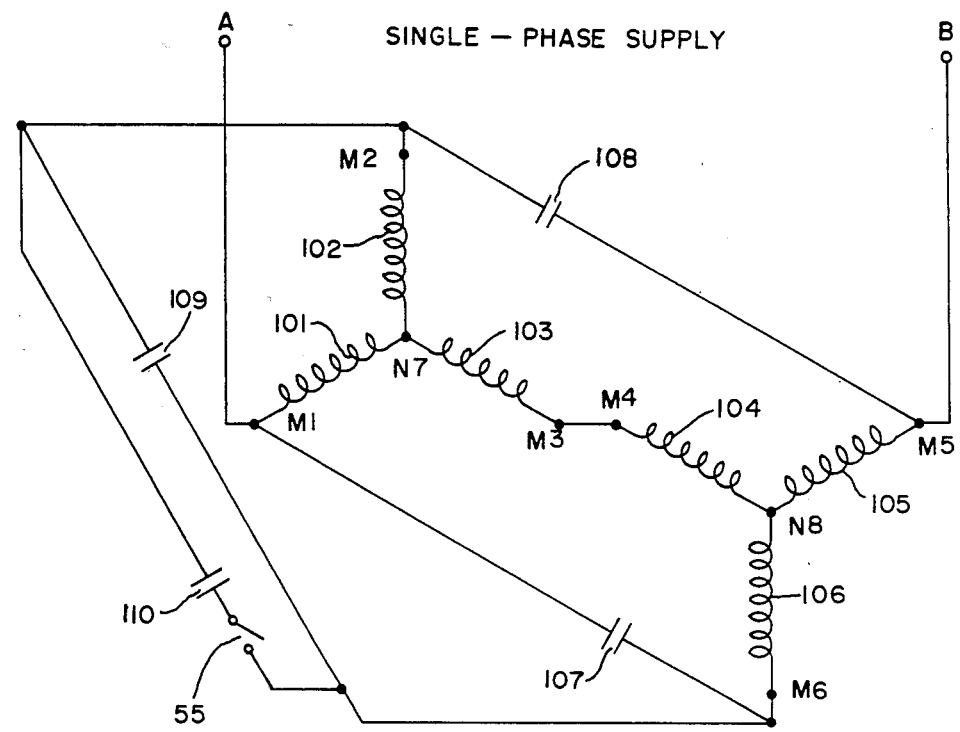
FIG.—1
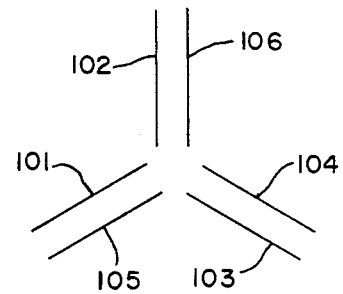
FIG.—1A
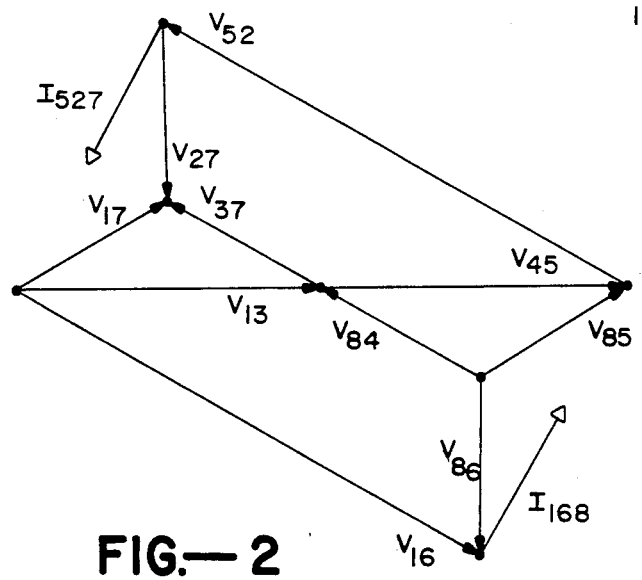
FIG.—2

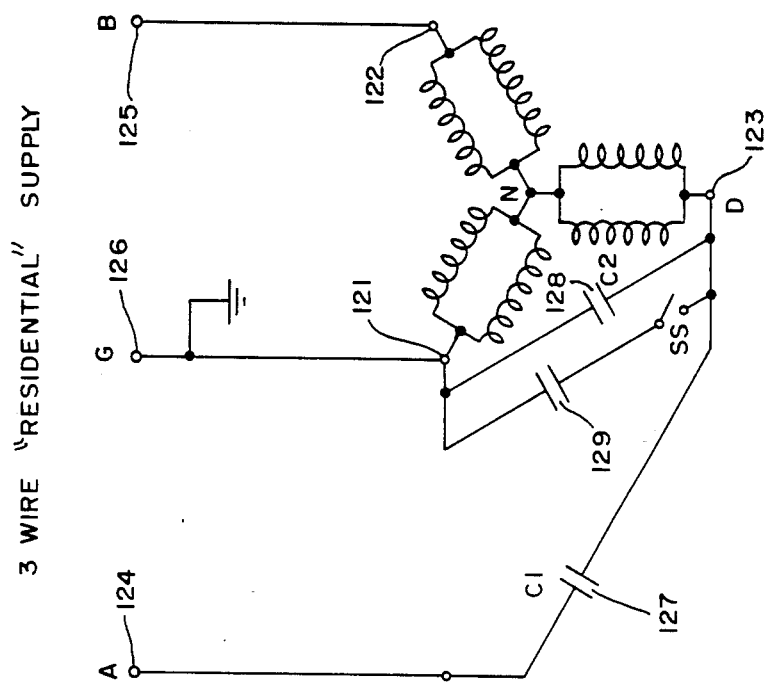
FIG.—4
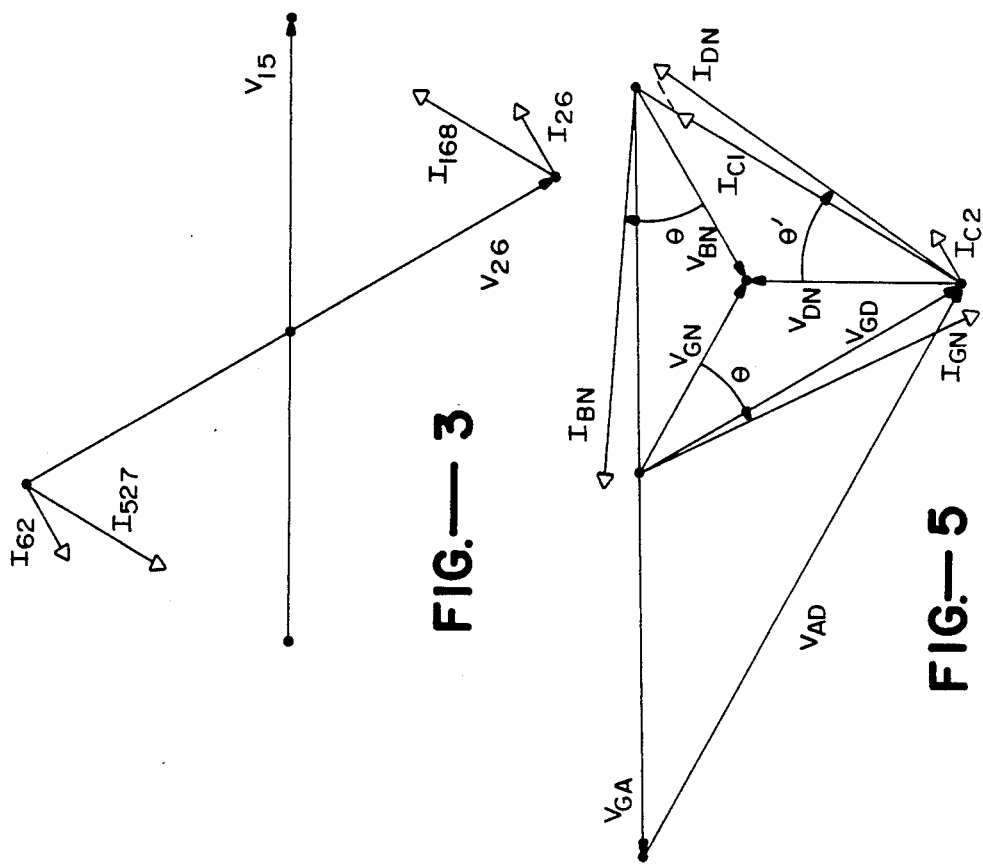
FIG.—3
FIG.—5

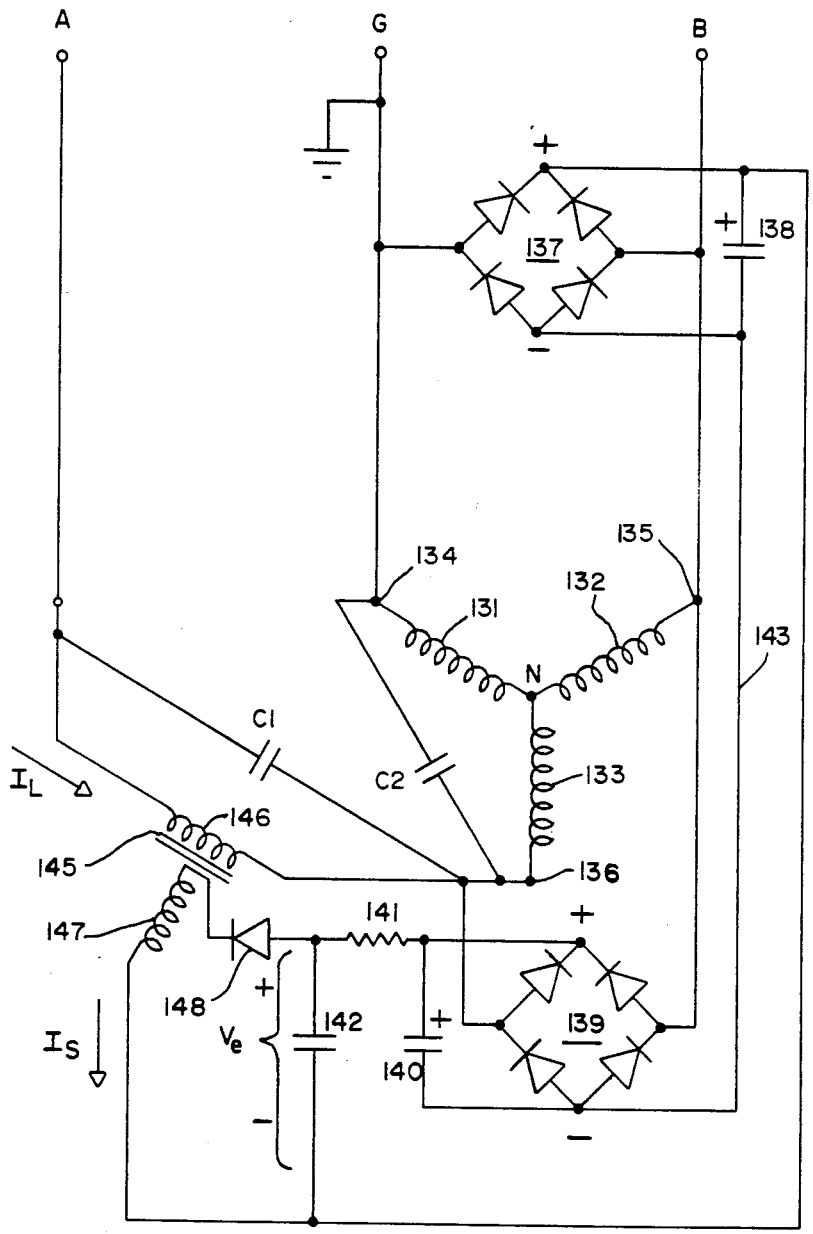
FIG.—6

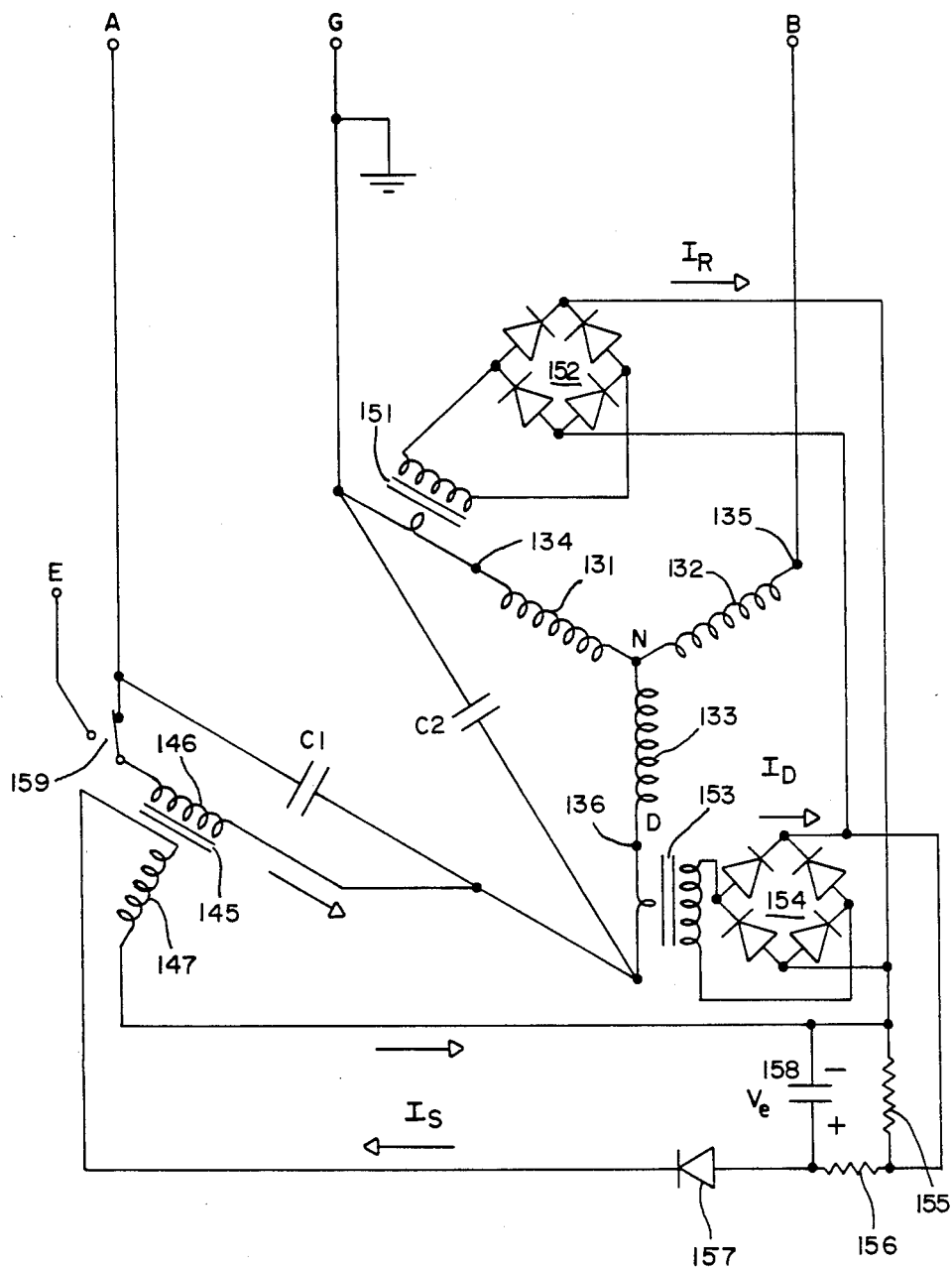
FIG.—7

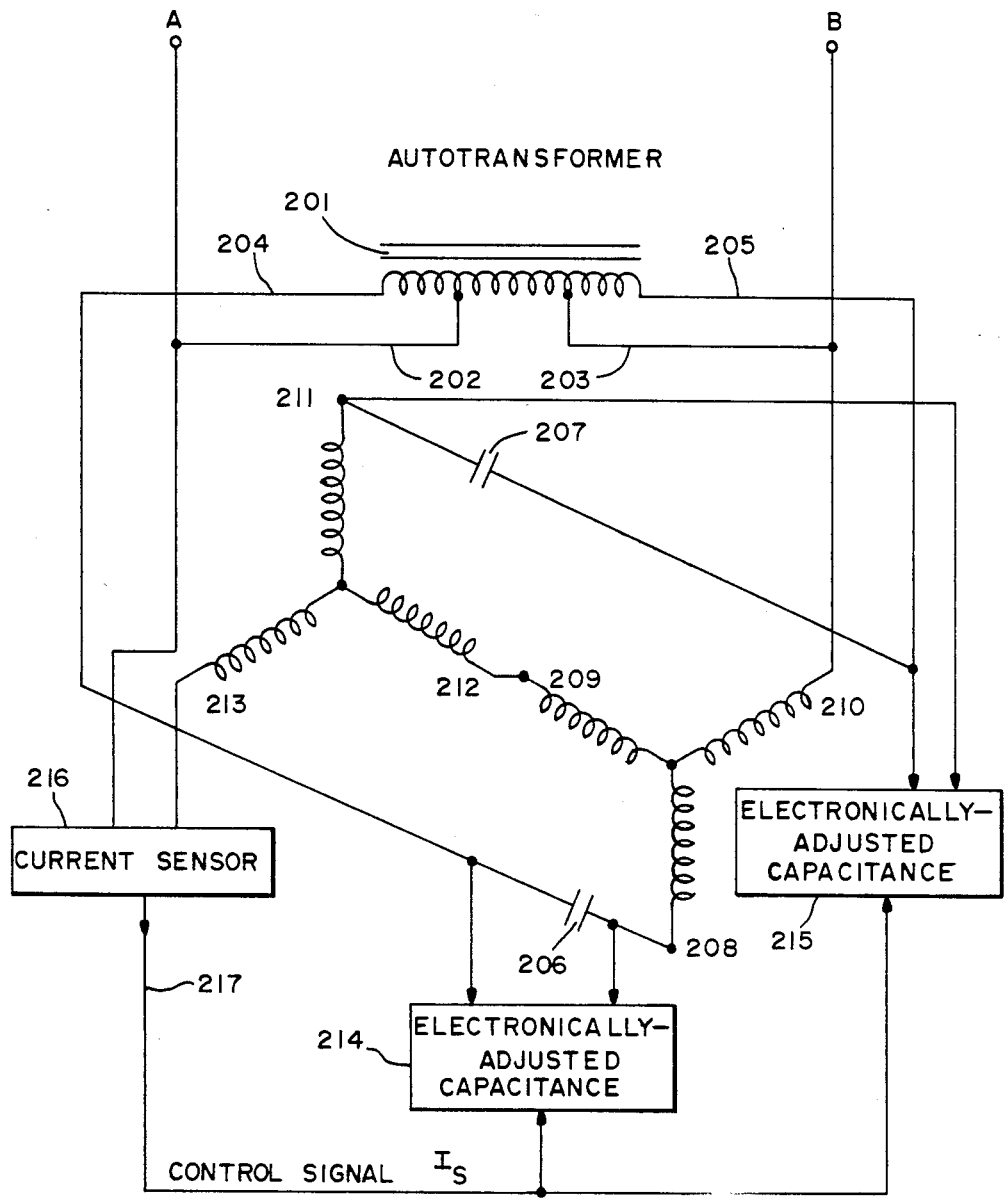
FIG.—8

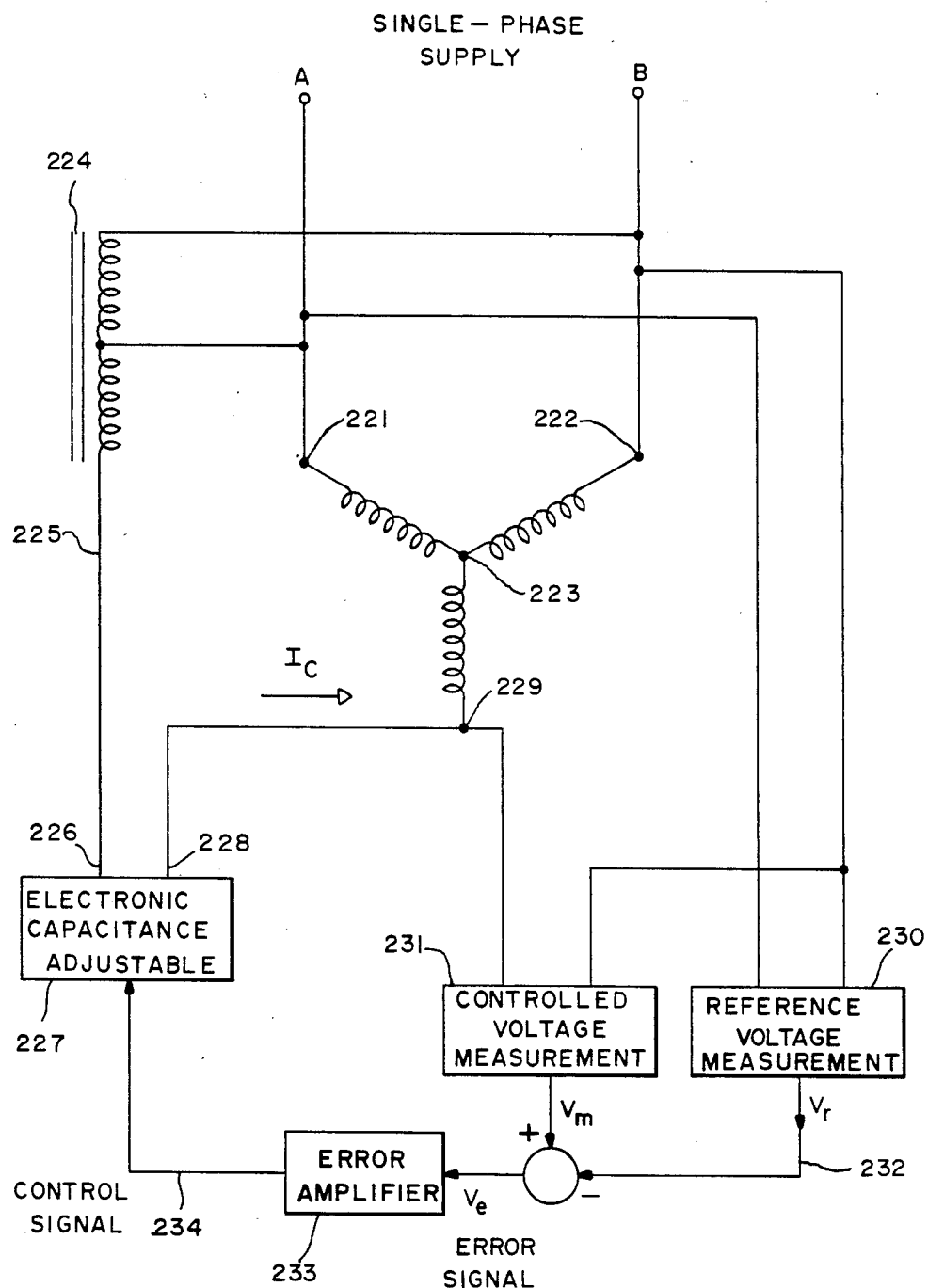
FIG.—9

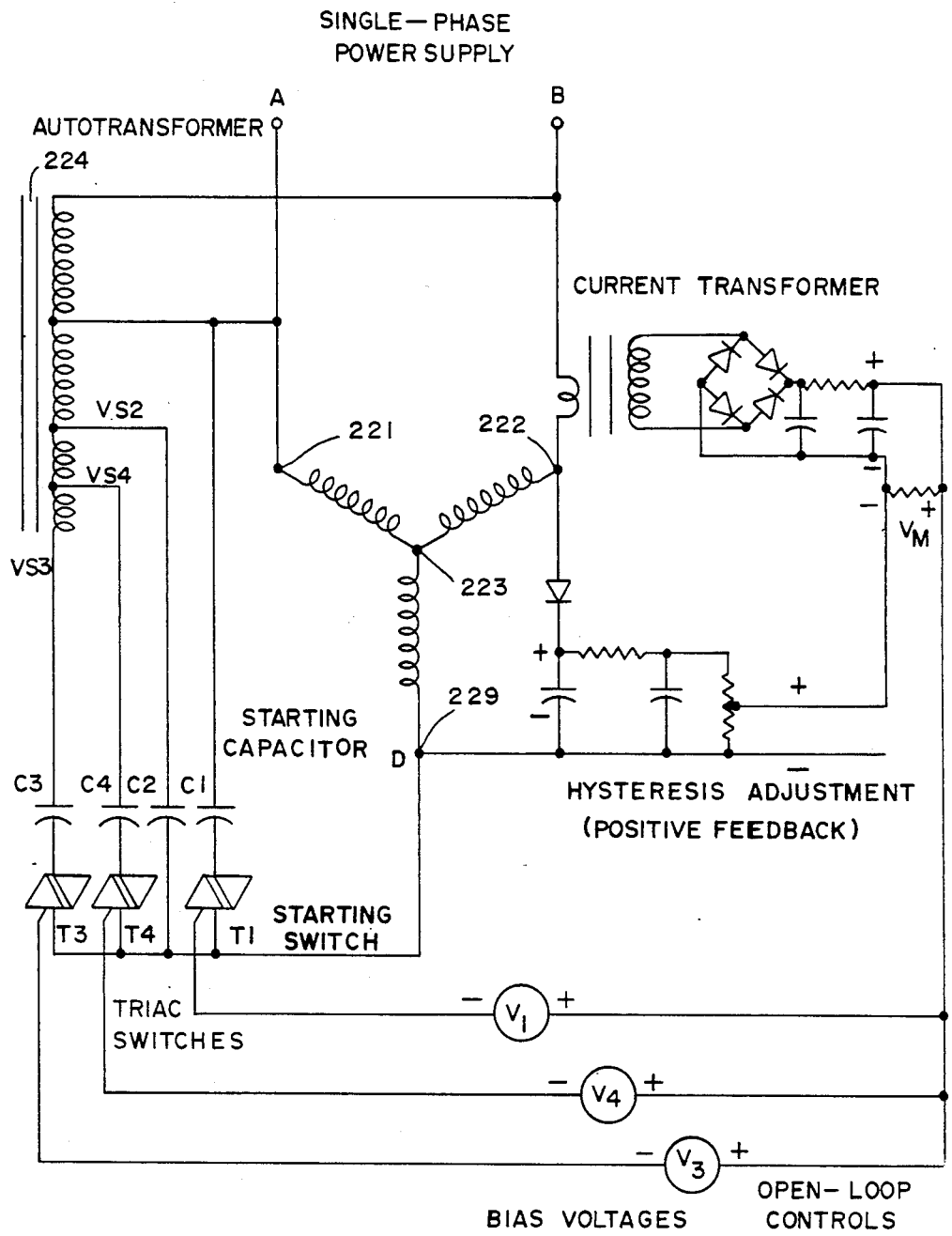
FIG.— 10

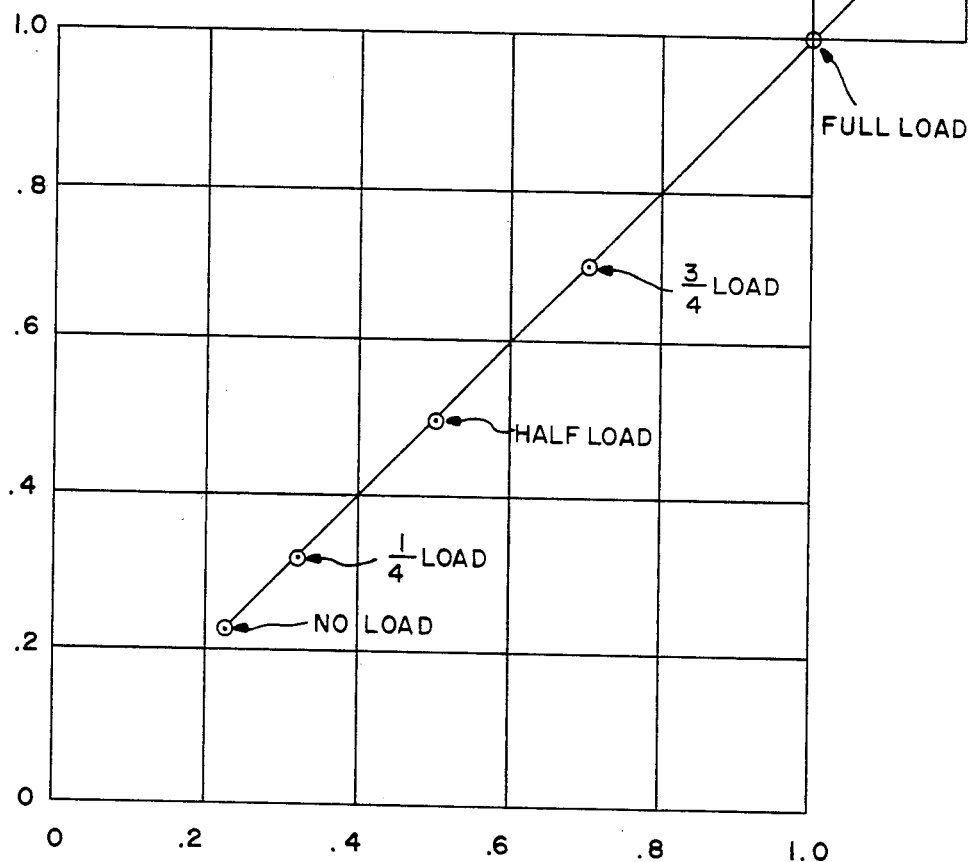
FIG.—11

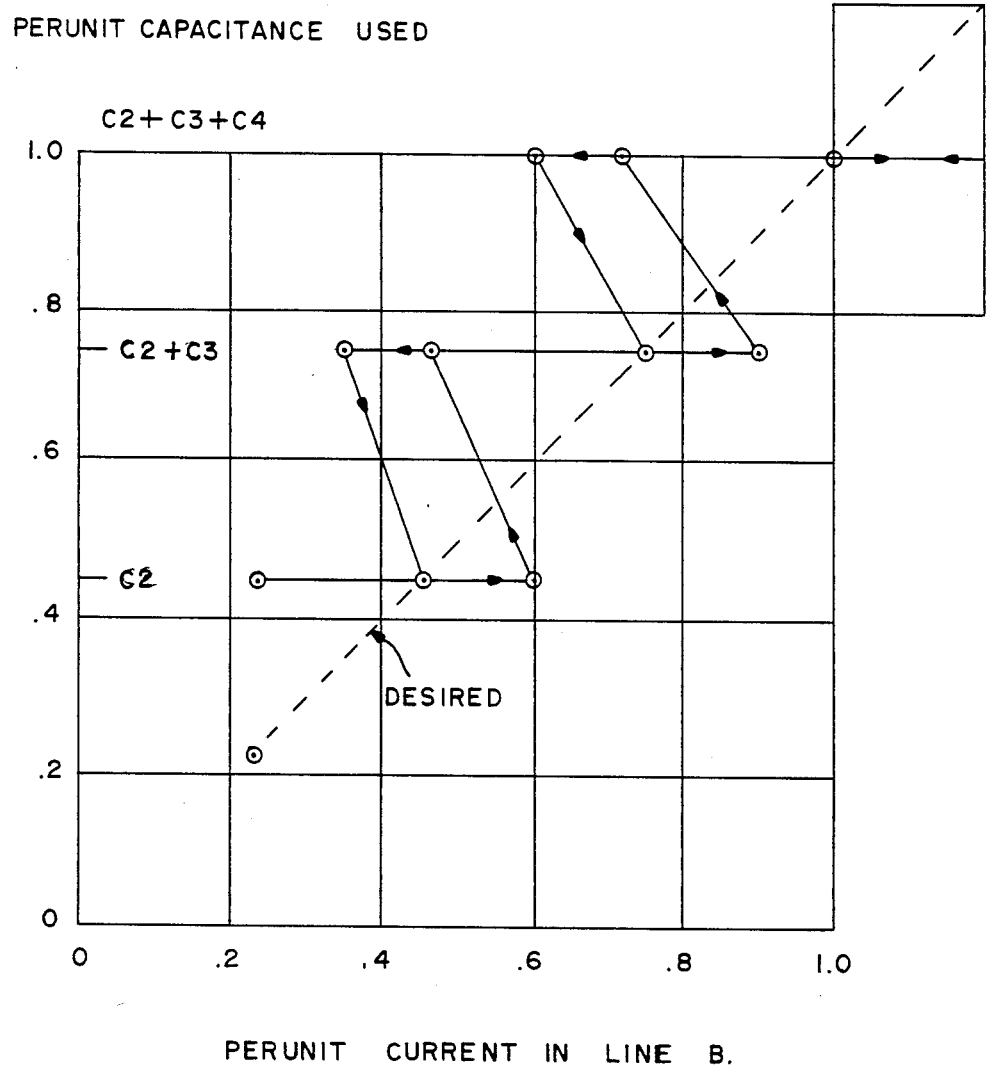
FIG.—12

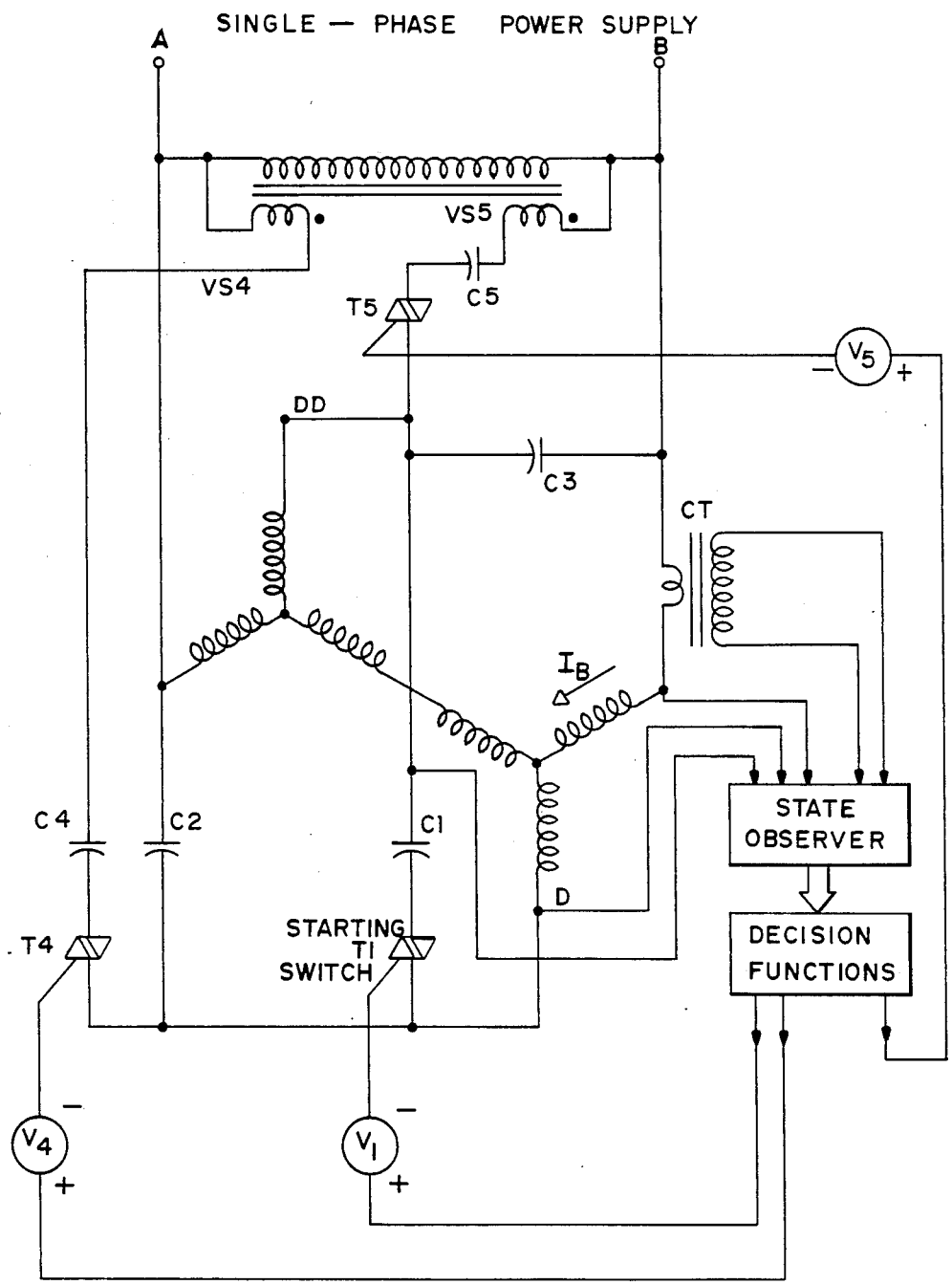
FIG.—13

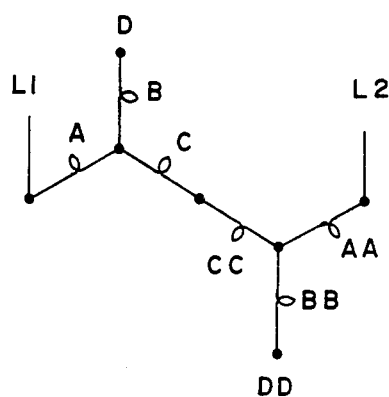
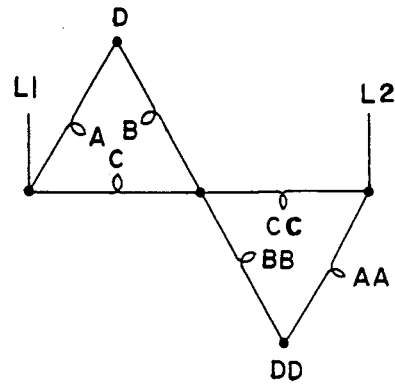
FIG.—14A                FIG.—14B
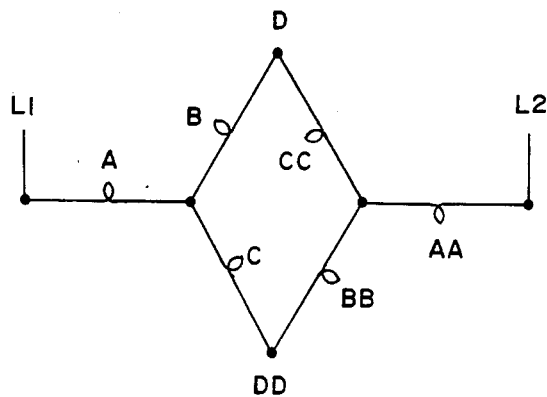
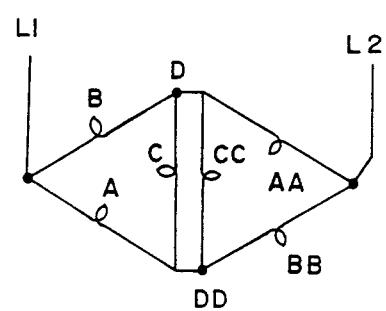
FIG.—14C                FIG.—14D
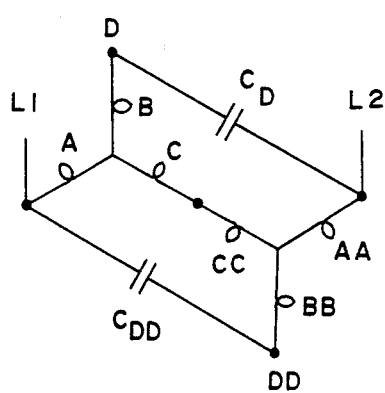
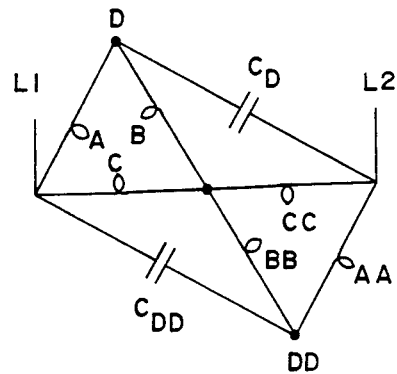
FIG.—15A                FIG.—15B

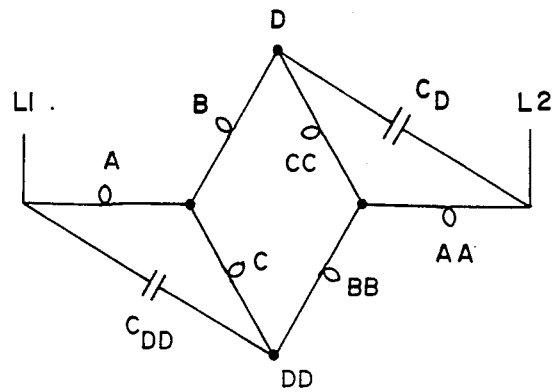
FIG.—15C
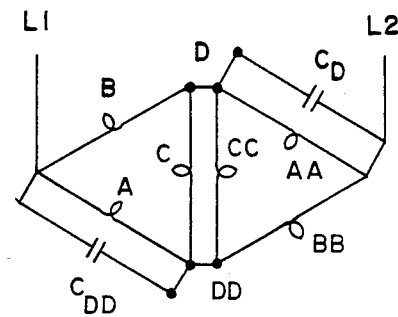
FIG.—15D
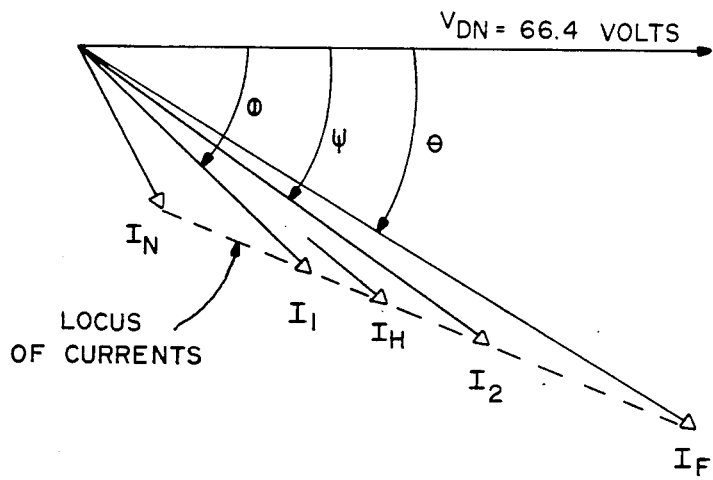
(CURRENT PHASORS FOR WINDING DN IN FIGURE 16)
FIG.— 17

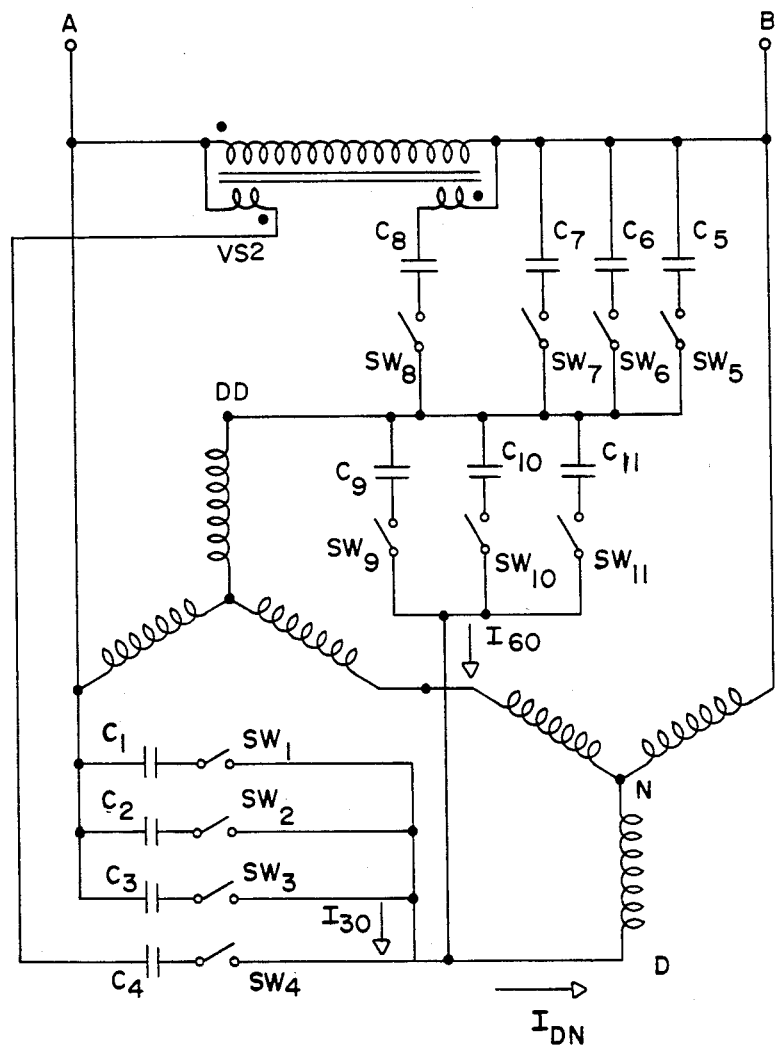
FIG.—16

THREE-PHASE INDUCTION MOTOR WITH SINGLE PHASE POWER SUPPLY

BACKGROUND OF THE INVENTION

The present invention is directed to a three-phase induction motor which is arranged for operation from a single phase power supply.

A three-phase motor is desired especially at higher horsepower ranges, for example, above 1 hp, because of its inherent efficiency over a single-phase type motor. These types of motors in effect generate a second phase (especially for starting) by a second winding in series with a capacitor. Such a capacitor run motor is usually more expensive and has lower efficiency than a corresponding equal power three-phase motor.

However, a three-phase motor can be operated from a single phase power supply by two well-known techniques. The first is a static phase converter and the second a rotary phase converter. Both are manufactured by Ronk Electrical Industries, Inc., of Nokomis, Ill. Both are discussed in a paper entitled, "Current Techniques in Phase Conversion Systems," by Claude M. Hertz, IEEE Conference Paper No. 78-83, IEEE Rural Electric Power Conference, Minneapolis, Minn., May 1-2, 1978.

More specifically, the static phase converter has an autotransformer and a series capacitor which goes to the third terminal of the three-phase motor. The tap off the autotransformer is chosen by the user as a function of the full load power facto of the user's motor. The capacitor size is selected by the manufacturer as a function of the motor current or motor horsepower.

There are two major disadvantages to the static converter:

1. A heavy expensive transformer is required; and
2. The motor currents and voltages are balanced only at full load on the shaft.

To quote from the article by Mr. Hertz:
"The major limitations are obvious from these characteristics; wide variations from the given load point should be avoided and breakdown torque is limited because of the reduced manufactured current ($I_A$) at overload.

The static phase converter is generally suited for single motor applications where the motor load remains relatively constant . . . It does not provide very good motor breakdown torque, does not operate well under extreme motor load variations and is usually more expensive per horsepower than other phase converter types."

The rotary phase converter, while well suited for multiple motor applications, has disadvantages in that "its idle losses are high and typically has limited starting torque. Motor current unbalance is usually high, with an associated decrease in motor life to be expected . . . ".

OBJECTS AND SUMMARY OF THE INVENTION

It is therefore a general object of the present invention to provide a three-phase induction motor which operates efficiently on a single-phase power supply.

It is another object of the invention to provide a static phase converter which utilizes a unique connection of the motor windings and does not require an expensive transformer.

Another object of the invention is to provide a feedback control circuit in conjunction with the three-phase induction motor of the invention to minimize the voltage or current unbalance for widely variable shaft loads.

Another purpose of the present invention is to provide an open loop control of the "manufactured" current for the third motor terminal, which is a preselected function of the current in a different motor terminal, so that for widely varying shaft loads, the voltage at the third motor terminal is equal to or above the rated voltage, with a preselected limitation on the degree of unbalance.

In one aspect of the invention there is provided a three phase induction motor with at least four different motor terminals, a two-terminal single phase supply, the first of the motor terminals connected to the first terminal of the single-phase supply, the second of the motor terminals connected to the second terminal of the single-phase supply. A first capacitor is connected between the third motor terminal and one terminal of the single-phase supply. The motor has 6 windings comprising two sets of three windings with pairs of windings from each set disposed together in common motor slots, and with each pair of windings spaced 120 electrical degrees from another. Each set is connected in a wye or delta configuration to provide three terminals at the ends of the wye or delta. One of the pairs of windings is directly connected together at their terminals, whereby the 6 windings have four terminals remaining which are the motor terminals.

From another aspect, the invention provides a three-phase motor with three motor terminass, a three-wire single-phase power supply with one intermediate voltage terminal and two maximum voltage terminals. The first of the motor terminals is connected to the first of the maximum voltage supply terminals. The second of the motor terminals is connected to the intermediate voltage supply terminal. And a capacitor is connected between the third of the machine terminals and the second of the maximum voltage supply terminals.

A third aspect of th invention is a power supply for a three-phase induction motor comprising a two-terminal single-phase power supply and transformer means to generate a third voltage. Two of the three terminals of the three-phase machine are connected to the two terminals of the power supply respectively. Electronically-adjustable capacitance means are connected between the third voltage and the third terminal of the motor to provide a capacitance current flowing into the third terminal. First voltage measurement means aee responsive to the voltage of the power supply and deliver a reference signal. Second voltage measurement means are responsive to the voltage of the third terminal and deliver a measurement signal. Subtraction means are responsive to the measurement signal and the reference signal to provide an error signal, the adjustable capacitance means being responsive to the error signal.

BRIEF DESCRIPTION OF THE DRAWINGS

FIG. 1 is a circuit schematic of a three-phase induction motor embodying the present invention.

FIG. 1A is a diagrammatic representation of the physical winding arrangement of hhe motor of FIG. 1.

FIGS. 2 and 3 are vector diagrams of currents and voltages present in the motor of FIG. 1.

FIG. 4 is an alternate embodiment of a three-phase induction motor embodying the present invention.

FIG. 5 is a vector (phasor) diagram of voltages and currents present in the motor of FIG. 4.

FIG. 6 is a circuit schematic of another embodiment of the invention which is a modification of the general embodiment of FIG. 4.

FIG. 7 is a circuit schematic of another embodiment of the invention which is a variation of FIG. 6.

FIG. 8 is a circuit schematic of yet another embodiment of the invention, utilizing an autotransformer and six windings.

FIG. 9 is a circuit schematic of another embodiment of the invention utilizing a feedback control system.

FIG. 10 is a circuit schematic of a non-feedback control system applied to the embodiment of FIG. 4.

FIG. 11 is a diagram of the optimum capacitance values for the operation of the motor of FIG. 10.

FIG. 12 is a plot based on FIG. 11 which shows actual capacitance values.

FIG. 13 is a schematic diagram of another embodiment of an induction motor of the present invention.

FIGS. 14A-14D show four different connections of six windings to produce a 4-terminal machine circuit.

FIGS. 15A-15D show the method of connecting capacitors to each of the 4-terminal machine circuits in FIGS. 14A-14D.

FIG. 16 is the circuit diagram for a high power motor control.

FIG. 17 is the current phasor diagram for FIG. 16.

DESCRIPTION OF PREFERRED EMBODIMENTS

Basically, a three-phase motor has three terminals designated alpha, beta and gamma, with the electrical phase sequence being $\alpha$, $\beta$, $\gamma$ for the desired direction of rotation. A single-phase supply has only two wires, which can be designated L1 and L2. When L1 is connected to $\alpha$, and L2 is connected to $\beta$, a third voltage must be "manufactured" or created by a circuit to excite terminal $\gamma$ for the three-phase motor to rotate in the desired direction. One way to create this third voltage for $\gamma$ is to connect a capacitor between $\alpha$ and $\gamma$. A large capacitor can be used for starting and a smaller capacitor can be used continuously for running, if the motor has a power factor angle near 60°. A high efficiency motor can have a full-load power factor angle near 30°; and it is better to connect the running capacitor between $\gamma$ and an autotransformer with a voltage higher than that on $\alpha$. With the correct adjustment of the autotransformer and the capacitor, the full-load currents and voltages can be balanced in all three terminals: $\alpha$, $\beta$, and $\gamma$.

It has been observed experimentally that the capacitor size should be reduced when the motor load is reduced in order to keep the currents balanced. When the capacitor is too small, the $\gamma$ current is too small, and the $\beta$ current and the $\alpha$ current are too great. The $\gamma$ voltage is below rated voltage.

When the capacitor is too large, the $\gamma$ current is too large, and the $\beta$ current and the $\alpha$ current are too small. The $\gamma$ voltage is above rated voltage.

Disclosed herein are three modes of control of the capacitor size to keep the currents balanced. In one mode (FIG. 6) the deviation of the $\gamma$ voltage from the rated voltage controls the $\gamma$ current by negative feedback. In another mode (FIG. 7) of control, the difference between the $\gamma$ current and the $\alpha$ current controls the $\gamma$ capacitor, by negative feedback. In a third mode (FIG. 10) of control, the capacitor capacitance is made linearly proportional to the $\beta$ current, which is relatively correct for the balanced conditions.

FIG. 1 shows the connection of a 6 winding three-phase induction machine to a single phase power supply. Winding 101 is connected between terminals M1 and N7. Winding 102 is connected between terminals M2 and N7. Winding 103 is connected between terminals M3 and N7. Winding 104 is connected between terminals M4 and N8. Winding 105 is connected between terminals M5 and N8. Winding 106 is connected between terminals M6 and N8. Terminals M3 and M4 are connected together. Terminal M1 is connected to line A of the single phase supply. Terminal M5 is connected to line B of the said single phase supply. Run capacitor 107 is connected between terminals M1 and M6. Run capacitor 108 is connected between terminals M5 and M2. Capacitors 107 and 108 are usually equal in microfarad values. Run capacitor 109 is connected between terminals M2 and M6. Start capacitor 110 is connected between terminal M2 and one plle of the starting switch SS. The other pole of the starting switch SS is connected to M6.

Windings 101, 102 and 103 form one wye-connected three-phase machine. Windings 104, 105 and 106 form a second wye-connected three-phase machine. These two sets are coupled by the common rotating flux inside of the motor. Usually, the winding pairs 101-105, 102-106 and 103-104 would occupy the same slots, as illustrated in FIG. 1A. The phase sequence is M1, M2, M3; and M4, M5, M6.

FIG. 2 shows the voltage phasor diagram for the induction machine in FIG. 1 when running normally. The phasor $V_{17}$ is the voltage drop in winding 101 from terminal M1 to terminal N7. The phasor $V_{27}$ is the voltage drop in winding 102 from M2 to N7. The phasor $V_{37}$ is the voltage drop in winding 103 from M3 to N7. The phasor $V_{84}$ is the voltage drop in winding 104 from terminal N8 to terminal M4. The phasor $V_{85}$ is the voltage drop in winding 105 from N8 to M5. The phasor $V_{86}$ is the voltage drop in winding 106 from terminal N8 to terminal M6. Phasor $V_{13}$ is the voltage drop from M1 to M3. Phasor $V_{45}$ is the voltage drop from M4 to M5. Phasor $V_{16}$ is the voltage drop from M1 to M6. Phasor $V_{52}$ is the voltage drop from M5 to M2.

$V_{17}$ and $V_{85}$ are are equal in phase and magnitude. $V_{27}$ and $V_{86}$ are equal in phase and magnitude. $V_{37}$ and $V_{45}$ are equal in phase and magnitude. $V_{16}$ and $V_{52}$ are equal in magnitude and have opposite phases.

The voltage $V_{16}$ across capacitor 107 causes the current $I_{168}$ to flow from M1 through 107 to M6 and into winding 106 to terminal N8. Current $I_{168}$ lags voltage $V_{86}$ by 30°.

The voltage $V_{52}$ across capacitor 108 causes the current $I_{527}$ to flow from M5 through 108 to M2 and into winding 102 to terminal N7. Current $I_{527}$ lags the voltage $V_{27}$ by 30°.

FIG. 3 shows some additional phasors from FIG. 1. The single phase power supply between terminals A and B produces the voltage drop $V_{15}$ from terminal M1 to terminal M5. Voltage phasor $V_{26}$ is the voltage drop between M2 and M6. This voltage drop is impressed across capacitor 109 and causes the capacitor current $I_{126}$ to flow into terminal M6 and through winding 106. The negative of this current, $I_{62}$, flows through capacitor 109 into terminal 192 and into winding 102. Current $I_{62}$ lags voltage $V_{27}$ by 60°. Current $I_{26}$ lags voltage $V_{68}$ by 60°.

The sum of $I_{168}$ and $I_{26}$ is the total power and magnetizing currents flowing into winding 106. The sum of $I_{527}$ and $I_{62}$ is the total power and magnetizing currents flowing into winding 102.

With the proper selection of the sizes of capacitors 107, 108 and 109, the currents in windings 102 and 106 can be adjusted to be equal i magnitude to the currents in windings 101, 103, 104 and 105. Stated differently, the three-phase machine will operate with balanced voltages and currents. Such selection can be accomplished experimentally very easily by utilizing adjustable capacitors and measuring phases and currents; capacitance values are unique for each type or rating motor.

To start this three-phase motor of FIG. 1 from the single phase supply, a capacitor 110 is provided in series with a starting switch, SS, which can be either a centrifugal switch on the motor shaft, or can be an electronic switch closed only for the time of acceleration. Starting currents are much larger than full-load running currents, and the starting current phase is much more lagging than the running current phase. Capacitor 110 is therefore many times larger than either capacitor 107 or capacitor 109. The current through capacitor 110 lags voltage $V_{68}$ by 60° and has the same phase with respect to the temporary starting voltage $V_{26}'$, as the phase of running current $I_{26}$ has with respect to the running voltage $V_{26}$ in FIG. 3.

FIG. 3.

The switch SS can be replaced by a non-linear device with conductance which is a function of a power of the current.

Alternatively, the switch SS can be controlled by a timer which opens the switch as the motor approaches full-load speed.

A significant concept of this invention is that two different capacitors (107 and 109) connected to two different voltage sources (M1 and M2), can provide two different phasor currents $I_{168}$ and $I_{26}$ respectively (FIG. 3); such that their sum in winding 106 can be correct in phase and magnitude to produce balanced three-phase currents in windings 104, 105 and 106. That is, the three winding currents are equal in magnitude and 120° apart in phase. The two capacitor magnitudes (capacitor 107 and capacitor 109) form a two dimensional oblique coordinate system. However, capacitor 109 may be eliminated for lag angles of less than 30°.

FIG. 3 has been drawn for the special case when $|I_{26}| = 0.468 |I_{168}|$ and the machine power factor is 0.772 and the machine load current lags the voltage by 39.457°. The total machine load current in winding 106 is the vector sum of $I_{26}$ and $I_{168}$ which has a magnitude of 1.425 $|I_{168}|$.

FIG. 4 shows another embodiment of the invention. The three-phase motor has teriinals 121, 122 and 123 with the windings arranged and connected in a normal manner. The power supply is a single phase voltage between terminal 124, marked line A, and terminal 125, marked line B, with a center-tap grounded terminal 126, marked G. In the United States, often the voltage between A and G is 115 volts; the voltage between B and G is 115 volts; and the voltage between A and B is 230 volts. This is a common 3-wire residential supply. The motor is connected as a 115-volt three-phase motor. Motor terminal 121 is connected to the ground terminal 126. Motor terminal 122 is connected to the supply line B terminal 125. Capacitor 127 is connected between motor terminal 123 and supply line A terminal 124. Capacitor 128 is connected between motor terminal 123 and motor terminal 121. Starting capacitor 129 is connected in series with a starting switch SS between motor terminals 121 and 123.

FIG. 5 is the full-load phasor diagram to explain the mode of operation of FIG. 4. For this diagram, letter designations have been inserted in FIG. 4. Terminal 123 is designated D. The center of the wye-connected motor windings is designated N. Terminals 121, 122 and 124 are designated G, B and A, respectively. Capacitors 127 and 128 are designated C1 and C2, respectively. The phase sequence is G, B, D.

With reference to FIG. 5, the induction machine terminal phasor voltages are $V_{GB}$, $V_{BD}$ and $V_{DG}$. The line-to-neutral voltage drop phasors in the induction machine are $V_{GN}$, $V_{BN}$ and $V_{DN}$. The phasor current flowing from supply 125 into terminal 122 and through the winding phase from B to N is $I_{BN}$. This is shown lagging the voltage $V_{BN}$ by the phase angle $\theta$.

Similarly, the current into the winding between G and N is $I_{GN}$, shown lagging the voltage $V_{GN}$ by the same phase angle $\theta$.

The current into the winding between D and N is $I_{DN}$, which lags the voltage $V_{DN}$ by the phase angle $\theta'$. The phasor current $I_{DN}$ is the sum of the phasor currents through the capacitors C1 and C2. The voltage across capacitor C1 is $\sqrt{3}$ times the magnitude of the voltage $V_{GB}$. It lags $V_{AB}$ by 30°. The magnitude of the current $I_{C1}$ is proportional to the microfarad capacity of capacitor C1.

The voltage across capacitor C2 is $V_{GD}$, which lags by 60°. The current $I_{C2}$ through capacitor C2 leads by 30°, or lags $V_{DN}$ by 60°. This current magnitude is proportional to the microfarad capacity of capacitor C2.

Capacitors C1 and C2 can be adjusted so that the phasor sum $I_{DN} = I_{C1} + I_{C2}$ is a current equal in magnitude to $I_{BN}$ and laggin $V_{DN}$ by $\theta$. With this condition, angle $\theta$, can be made equal to $\theta$ and the three machine currents are balanced three-phase and the machine voltages are balanced three-phase.

The three-phase motor in FIG. 4 can therefore be operated as balanced three-phase from a center-tapped single-phase supply. Perfect balance can be achieved because there are two adjustable capacitors to adjust the two coordinates of the current into D: magnitude and phase, or in-phase and out-of-phase current components.

The capacitor sizes can be calculated from the following sequence: given the motor line current $I_{DN}$ and power factor pf $$\theta = \cos^{-1}(Pf)$$

$$I_{C1} = I_{DN} \cos(\theta + 30°)/\cos(60°) = 2I_{DN} \cos(\theta + 30°)$$

$$I_{C2} = I_{DN} \cos(120° - \theta)/\cos(60°) = 2 I_{DN} \cos(120° - \theta)$$

$$w = 2\pi f = 2\pi(60) = 376.991$$

$$X_1 = V_{AD}/I_{C1} = \sqrt{3} \; V_{GA}/I_{C1} \text{ ohms}$$

$$X_2 = V_{GD}/I_{C2}$$

$$C_1 = 1/wX_1 \text{ farads}$$

$$C_2 = 1/wX_2 \text{ farads}$$

FIG. 5 has been drawn for the particular case when the power factor is 0.819 and $\theta$ is 35°. A four-pole, 1-horsepower, 115-volt three-phase motor with a full load efficiency of 0.831 and a power factor of 0.819 has a full load current of 5.50 amperes. For this motor, $I_{DN} = 5.50$ amperes.

$$I_{C1} = 11.0 \cos(65) = 11.0 \, (0.423) = 4.649 \text{ amperes}$$

$$I_{C2} = 11.0 \cos(85) = 11.0 \, (0.0872) = 0.9587 \text{ amperes}$$

$$X_1 = \sqrt{3} \; 115/4.649 = 199.2/4.649 = 42.845 \text{ ohms}$$

$$X_2 = 115/0.9587 = 119.95 \text{ ohms}$$

$$C_1 = 1/(w \cdot 42.845) = 61.91 \times 10^{-6} \text{ farads}$$

$$C_2 = 1/(w \cdot 119.95) = 22.11 \times 10^{-6} \text{ farads}$$

The effect of improper adjustment of the capacitors can be either calculated analytically or measured experimentally. If capacitor C1 is too large, both voltages $V_{GD}$ and $V_{BD}$ will be larger than $V_{GB}$.

Starting with balanced conditions at constant load, when the capacitor $C_1$ size deviates from the correct value, $I_{DN}$ is approximately proportional to the capacitor size, and the winding currents $I_{GN}$ and $I_{BN}$ are approximately inversely proportional to the capacitor size, but $I_{GN}$ varies more than $I_{BN}$.

If the capacitor size is near zero, the motor operates as a conventional single-phase motor, with currents in $I_{GN}$ and $I_{BN}$ significantly larger than for balanced three-phase operation.

With a fixed capacitor at high loads, and power deviations from the balanced three-phase condition, the currents $I_{GN}$ and $I_{BN}$ are approximately proportional to the square of the power, but $I_{GN}$ varies more than $I_{BN}$ for changes in power. The current $I_{DN}$ is approximately inversely proportional to the square root of the power.

A high efficiency three-phase motor in the one to twenty horsepower range usually has a full load current phase angle $\theta$ near 35°. For this motor, most of the excitation current for winding DN comes from capacitor C1 and very little current is contributed by capacitor C2. Capacitor C1 is the most important to adjust.

FIG. 5 is the phasor diagram for the circuit in FIG. 4. Phasor $V_{GN}$ is the voltage drop in the winding from 121 to N. Phasor $V_{BN}$ is the voltage drop in the winding from 122 to N. Phasor $V_{DN}$ is the voltage drop in the winding from 123 to N. Phasor $I_{BN}$ is the phasor current in the winding from 122 to N. Phasor $I_{GN}$ is the phasor current in the winding from 121 to N. It lags the corresponding voltage drop by the angle $\theta$. Phasor $V_{AD}$ is the voltage drop across the capacitor C1. Phasor $I_{C1}$ is the current through ccapacitor C1 which leads $V_{AD}$ by 90°. Phasor $I_{C2}$ is the current through capacitor C2 which has the voltage $V_{GD}$ across it. $I_{C2}$ leads $V_{GD}$ by 90°. The sum of $I_{C1}$ and $I_{C2}$ is the phasor $I_{DN}$ which is the current into the winding from D to N and which lags the voltage $V_{DN}$ by $\theta'$ degrees. $\theta'$ is made equal to $\theta$ by adjusting the ratio of $I_{C2}$ to $I_{C1}$ by adjusting the magnitude of the capacitors C2 and C1 respectively. $|I_{DN}|$ is made equal to $|I_{BN}|$ by adjusting the sum of $I_{C1}$ and $I_{C2}$ by adjusting the magnitude of the capacitors C1 and C2, respectively. Since there are two capacitors, the adjustments can adjust two variables: the magnitude and the phase of $I_{DN}$.

A major factor for achieving balanced three-phase currents and voltages in the three-phase motor is having two difeerent capacitors supplied by two different single phase voltages to create the excitation current for terminal D.

In FIG. 4, a starting capacitor 129 is in series with a starting switch SS. This switch SS can be an electronic timer or a current-sensitive relay responsive to the starting current which is much larger than the full-load circuit. Switch SS is open after starting. The phasor diagram in FIG. 5 is for full-load running condition, with switch SS open.

FIG. 6 shows an automatic control applied to the circuit in FIG. 4. The three-phase motor windings 131, 132 and 133 are connected to the three terminals 134 135 and 136, respectively, and to the center-tap N of the wye connection. Terminal 135 is connected to one high voltage terminal of the single phase supply B. Terminal 134 is connected to an intermediate voltage terminal G of the single-phase supply. One side of capacitor C1 is connected to the other high voltage terminal of the single phase supply A, and the other side of capacitor C1 is connected to motor terminal 136. Capacitor C2 is connected between motor terminals 134 and 136.

The supply voltage $V_{BG}$ is measured by the bridge rectifier 137 to charge capacioor 138 with a d-c voltage proportional to the magnitude of the ac voltage $V_{BG}$. The voltage drop between terminal 136 and terminal 135 is designated by the phasor ac voltage $V_{DB}$ and is measured by the bridge rectifier 139 and d-c capacitor 140. The dc voltage on capacitor 140 is proportional to the magnitude of the ac voltage $V_{DB}$. Wire 143 connects the negative terminal of capacitor 138 to the negative terminal of capacitor 140. Resistor 141 in series with capacitor 42 forms a low-pass or averaging filter. The voltage on capacitor 142 is the average of the voltage impressed across the series R-C combination. The voltage impressed across the series combination is proportional to $||V_{DB}| - |V_{GB}||$. $V_e$ is the average voltage appearing across capacitor 142. $V_e$ is zero when $|V_{DB}| = |V_{GB}|$. This is the condition for balanced three-phase operation.

When C1 is too large, $|V_{DB}|$ is greater than $|V_{GB}|$ and $V_e$ is positive.

Unit 145 is a saturable reactor with an a-c power winding 146 and d-c control winding 147. The ac power winding 146 is connected in parallel with capacitor C1. The dc control winding is connected in series with the diode 148 and the series combination is connected across capacitor 142. The voltage $V_e$ causes a current $I_S$ to flow through the control winding 147 proportional to $V_e$. The polarity is chosen so that this current $I_S$ is in the direction to increase the saturation of the iron and to decrease the ac reactance of the power winding 146 and to increase the ac power winding current $I_L$.

Capacitor C1 is chosen so that when the motor is running at full load, and the saturable reactor 145 has maximum reactance in winding 146 (minimum saturation), then the motor winding currents and voltages will be balanced, and voltage $V_e$ will be zero.

When the shaft load is reduced below full load, then momentarily capacitor C1 will seem to be too large, voltage $|V_{DB}|$ will exceed voltage $V_{GB}|$, and $V_e$ will go positive proportional to the voltage error. A saturating current will therefore flow in winding 147, reducing the reactance of 146, and causing a component of current to flow in 146 which is opposite in phase to the current in C1, and reducing the apparent capacity current flowing into terminal D. This is a negative feedback cntrol system, whose equilibrium state is $|V_{DB}|=|V_{GB}|+\epsilon$, where $\epsilon$ is a negligible error, typically a fraction of 1%. The saturable reactor therefore automatically keeps the voltage $V_{DB}$ almost equal to the supply voltage $V_{GB}$. This can be considered an automatic method of tracking the shaft load for a motor with widely varying loads.

FIG. 7 shows an alternate method of bypassing the current through C1 when the shaft load is less than full load and the current through C1 is larger than the current needed by terminal D of the three-phase motor. Switch 159 connects terminal A to the supply side of winding 146. A current transformer 151 has its secondary connected to a bridge rectifier 152 which delivers a rectified current $I_R$ proportional to ac current $I_{GN}$. Current transformer 153 has its secondary connected to a bridge rectifier 154 which delivers a rectified current $I_D$ proportional to ac current $I_{DN}$. The difference of $I_D$ minus $I_R$ flows through resistor 155. The voltage across resistor 155 is loaded by the series combination of resistor 156, diode 157, and control winding 147. The series combination of resistor 156 and capacitor 158 is a low pass filter which produces across capacitor 158 an average of the voltage across resistor 155. The voltage across capacitor 158, designated $V_e$, is proportional to the average difference between the magnitude of the ac current $I_{DN}$ and the magnitude of the ac current $I_{GN}$. When C1 is too large for the shaft power, $I_{DN}$ is too large, $I_{GN}$ is too small, $V_e$ is positive, a positive saturating current $I_s$ flows through diode 157 and control winding 147, saturable reactor 145 is partially saturated by this current $I_s$, the reactance of winding 146 is less than its unsaturated maximum, and an ac load current $I_L$ flows from A through switch 159 and winding 146, which current lags ac voltage drop $V_{AD}$. The ac current $I_{C1}$ leads the ac voltage drop $V_{AD}$. The sum of $I_{C1}$ and $I_L$ is an ac current that leads ac voltage drop $V_{AD}$ and is less than $I_{C1}$. This is a negative feedback control system whose equilibrium state brings $|I_{DN}|$ down and $|I_{GN}|$ up until they are almost equal, with a difference which is practically negligible, that is, a fraction of a percent. The three-phase motor will run at nearly balanced currents and voltages for all shaft loads between full load for which $I_L$ is a minimum, down to no-load, for which phasor $I_{DN}=$ phasor $I_{C2}+I_{C1}+I_L)$, for which phasor $I_L$ is a maximum and essentially opposite in phase to $I_{C1}$.

This particular control circuit causes the locus of the change in the load current $I_{DN}$ to follow along a line which lags $V_{DN}$ by less than 30°. It is within the scope of this invention to adjust the locus of the change in the load current $I_{DN}$ with change in shaft load by incorporating additional circuits in series and in parallel with winding 146, and to connect winding 146 to voltages other than the voltage on terminal A. For example, an autotransformer excited by voltage $V_{AG}$ could supply the terminal E with a voltage other than the voltages on A and G. With switch 159 in the position to connect E to winding 146, a different voltage other than that on A will be supplied to winding 146.

FIG. 8 is an alternate connection of a six-winding three-phase motor to a single phase supply A-B which can provide excitation currents which lag the winding voltages by less than 30°. The autotransformer 201 has a terminal 202 which is connected to the supply terminal A. Terminal 203 on the autotransformer 201 is connected to supply terminal B.

The motor has one wye connection with three-phase terminals 208, 209 and 210 with the voltage phase sequence being 208, 209, 210. The motor has another wye connection with three-phase terminals 211, 212 and 213 with the voltage phase sequence being 211, 212 and 213. Terminal 204 of the autotransformer is connected to one side of capacitor 206 whose other side is connected to 208. Capacitor 207 is connected between terminal 205 of the autotransformer and 211. 213 is connected to A. 210 is connected to B. 209 is connected to 212.

When the motor is running, the current through capacitor 206 will excite the winding connected to 208 with a current which lags the voltage drop in the winding by less than 30°. When the voltage between 204 and 202 is increased by a different design, the phase angle in the motor is diminished.

Similarly, the current through capacitor 207 due to the voltage on terminal 205 excites the winding connected to 211 with a current which lags the winding voltage by less than 30°.

Electronically-adjusted capacitances 214 and 215 are connected in parallel with 206 and 207, respectively. The values of these capacitances 214 and 215 are adjusted by a control signal $I_s$ so that the composite capacitance is correct for a wide variation in load currents. The load current magnitude is sensed by current sensor 216 to generate the control signal 217.

FIG. 9 shows the block diagram for the control of a standard three-phase motor 223. Terminals 221 and 222 of the three-phase induction motor 223 are connected to terminals A and B respectively of a single phase ac power supply. Transformer 224 is excited by the single phase power supply and delivers a voltage on terminal 225 which is connected to terminal 226 of the electronically-adjusted capacitance 227. The other terminal 228 of the capacitance 227 is connected to the third terminal 229 of the induction motor 223. The voltage between A and B is supplied to the reference voltage measurement 230. The voltage between 229 and 222 is supplied to the controlled-voltage measurement unit 231. The block diagram in the lower part of FIG. 9 is the negative feedback control system to control the voltage on terminal 229. Output signal 232 is proportional to the magnitude of the ac voltage $V_{AB}$. This is the reference signal $V_r$. Output signal $V_m$ is proportional to the magnitude of the ac voltage between terminal 229 and terminal 222. $V_e$ is $V_m$ minus $V_r$. This is the error signal which is amplified by the amplifier 233 which delivers a control signal 234. The control signal enters unit 227 and modifies the effective capacitance between 226 and 228. The polarity of changes is as follows: an increase in voltage at 229 increase $V_m$, increases $V_e$, and increases the control signal 234. This diminishes the effective capacitance and diminishes the capacitance current $I_C$ flowing from 228 to 229.

The three-phase voltages on 221, 222 and 223 will remain essentially balanced for all shaft loads between full load and no load, a range of currents $I_C$ of approximately four to one.

FIG. 10 is an open-loop preselected control system applied to the three terminal motor circuit of FIG. 9. The autotransformer 224' primary is connected to the single phase power supply terminals A and B. The voltage from $V_{se}$ to A is approximately equal to the voltage from A to B. Voltages $V_{s4}$ and $V_{s3}$ to $V_{s2}$ are a small fraction of the voltage from $V_{s2}$ to A. A is connected to capacitor C1. $V_{s2}$ is connected to capacitor C2. $V_{s4}$ is connected to capacitor C4. $V_{s3}$ is connected to capacitor C3. Two terminals of the three-phase motor are connected to A and B. The third terminal of the three phase machine is designated D. For the desired direction of shaft rotation, the voltage phase sequence is A, B, D. The other terminal of C2 is connected to D. The other terminals of C1, C3 and C4 are connected through triacs T1, T3 and T4, respectively, to terminal D.

The control sequence is T1, T3 and T4. They are all conducting on starting. At full load, rated speed, T1 is nonconducting and T3 and T4 are conducting. When reducing load, near 60% load, T4 is nonconducting but T3 is conducting. At 25% load, all triacs are nonconducting. To accomplish this control, in FIG. 10, the current transformer measures the machine current in phase B and delivers a dc voltage $V_M$ which is proportional to the machine winding current. The three triacs receive on the control electrodes three bias voltages tending to prevent conduction, plus the voltage $V_M$ tending to cause conduction. On starting, the very high starting current produces a high $V_M$ so that all of the triacs are conducting. At no load on the shaft, $V_M$ is small. Voltage $(V_m - V_1)$ is sufficiently negative to hold T1 nonconducting. Voltage $(V_M - V_3)$ is sufficiently negative to hold T3 nonconducting. Voltage $(V_M - V_4)$ is sufficiently negative to hold T4 nonconducting. As the shaft load increases, $V_M$ increases, and near half current, T3 will conduct. As the shaft load increases further $V_M$ increases further, and near 80% current, T4 will conduct.

The action of the capacitors is approximately: at light loads, C2 conrributes current into D lagging about 30°; C3 contributes another current component into D lagging about 22°; C4 contributes another current component into D lagging about 26°.

FIG. 11 is a plot of the optimum capacitance versus per unit current in line B. No-load current is 25%. At 25% shaft load, the line current is 32%. At half-load on the shaft, the line current is 50%. The smooth curve in FIG. 11 has to be approximated by digitized capacitance values as shown in FIG. 12. For this particular example, voltage $V_{s2}$ and capacitance C2 are selected to produce exactly balanced voltages and currents at 45% current. Voltage $V_{s3}$ and capacitance C3 are selected to add a current at small lagging angle so that the voltages and currents are exactly balanced at 75% current. Voltage $V_{s4}$ and C4 are selected so that the voltages and currents are exactly balanced at full load current. In FIG. 10, a hysteresis adjustment is made by a small amount of rectified voltage from D to B, which is added in series with $V_M$ in a positive feedback polarity. The effect of this extra voltage is to make the turn-on voltage of each triac control to be larger than the turn-off control voltage.

FIG. 12 shows the net effect of the control components in FIG. 10. C2 is always in the circuit. As line B current increases from no load, the capacitance is constant from no-load current of 25% up to the "switchnng" value of 60% current. Above 60% current, C2 and C3 are conducting. As load increases further, at about 90% current, C2, C3 and C4 are conducting. As load is diminished, C4 stays conducting until the current is less than 60%. C3 stays conducting until the current is less than 35%.

This control is satisfactory because the capacitors do not switch too often. Usually, there is too much capacitance, which makes the current in D larger than the current in B, and makes the voltage at D larger than rated voltage. This produces a desirable torque characteristic. It is undesirable to have the voltage at D significantly below the rated value. In case the motor is subjected to heavy overloads, the sum of C2, C3 and C4 should produce balanced currents at a preselected overload value, not at full load.

The KVA of the transformer 224' in FIG. 10 is about 58% of the KVA of the motor. The KVA of the capacitors (C2+C3+C4) in FIG. 10 is approximately equal to the KVA of the motor. But by using the six winding circuit of FIGS. 1 and 8, the cost of the transformer can be greatly reduced.

It is within the scope of this invention to set the voltages in FIG. 10 so that any two or any three of the voltages $V_{s2}$, $V_{s3}$, and $V_{s4}$ are identical.

It is within the scope of this invention to use the current transformer rectifier, sets of bias voltages and sets of triac switches as in FIG. 10 in conjunction with a plurality of capacitors to automatically adjust and ccontrol capacitor 109 in FIG. 1, and capacitors 107 and 108 in FIG. 1, and capacitors 127 and 128 in FIG. 4.

FIG. 13 has the six-winding four-terminal motor circuit. The transformer across the single phase supply A, B has two low-voltage secondaries of the filament-transformer type. Voltage $V_{s4}$ is different than voltage A and is chosen to produce the correct phase angle of the full-load current in the motor windings, particularly at D.

Voltage $V_{s5}$ is also different than voltage B, and is chosen to produce the correct current phase angle at DD at full load. In general, the voltage difference from $V_{s4}$ to $V_{s5}$ is larger than the voltage A, B, and the motor current phase angle is less than 30°. If the full-load current phase angle were more than 30°, no transformer would be needed, and the circuit in FIG. 1 would be adequate.

In FIG. 13, capacitors C2 and C3 are equal; capacitors C4 and C5 are equal. Voltages $V_4$ and $V_5$ are equal. Capacitor C1 is the starting capacitor. Capacitors C2 and C3 are selected to produce balanced currents at 65% current. Capacitor C4 is in series with triac T4 between $V_{s4}$ and motor terminal D. Capacitor C5 is in srries with triac T5 between $V_{s5}$ and motor terminal DD. Capacitors C4 and C5 are selected so that when triacs T4 nnd T5 are conducting at full load, the motor currents will be balanced.

In FIG. 13, the state observer contains components like the rectifiers and filters of FIG. 10. Information from the state observer is passed to the decision functions unit. One output of this unit is a voltage proportional to the motor current $I_B$ which is passed through a bias voltage $V_1$ to the control input of triac T1 to turn on triac T1 when the starting current is 150% above full-load current. This connects C1 into the circuit like capacitor 110 in FIG. 1. Near rated speed, the triac T1 is turned off.

Other outputs of the decision functions unit are circuits through bias voltages $V_4$ and $V_5$ to the control inputs of triacs T4 and T5, respectively. When current $I_B$ exceeds 70% of rated current, triacs T4 and T5 are turned on, and capacitors C4 and C5 conduct current to terminals D and DD, respectively. When current $I_B$ is less than 60% of rated current triacs T4 ad T5 are turned off.

But for power factor angles of more than 30°, the use of capacitor 109 in FIG. 1 instead of the transformer in FIG. 13 has the additional advantage of lighter weight and lower cost than a static phase converter having capacitors, triacs, current transformers, and circuit components.

Thus, an improved three-phase induction motor with single phase power supply has been provided.

FIGS. 14A–14D show several methods of connecting a 6-winding three-phase machine to achieve a 4-terminal machine. The individual coils have been marked A, B, C, and AA, BB, and CC. Coils A and AA are either in the same slots, or in a multipole machine, have voltages that are in phase. Similarly, coils B and BB are in the said slots or have voltages that are in phase. Similarly, coils C and CC are in the same slots or have voltages that are in phase. One end of coil A in every case is connected to the power supply line L1. The opposite in-phase end of coil AA in every case is connected to the other power supply line L2.

In FIG. 14A coils A, B, and C are connected in a configuration as a 3-phase wye machine. Coils AA, BB, and CC are connected in a second configuration as a second 3-phase wye machine. Coils C and CC are connected in series. The remaining terminals of coils B and BB are designated D and DD, respectively. The power supply line-to-line voltage between L1 and L2 is designated VS. FIG. 14A is the connection used in FIGS. 1, 8 and 13. One half of the voltage VS appears across the terminals of each of the said "wye machines." That is, VS/2 is the magnitude of the voltage between L1 and D, between D and G, between G and L1, between G and L2, between L2 and DD, and between DD and G. The voltage between L1 and DD (for capacitor C1) is $(\sqrt{3})$ (VS/2) FIG. 14A is a wye-wye half-line-voltage mode.

FIG. 14B in FIG. 14 has coils A, B and C connected in delta with phase sequence A, B, C. Coils AA, BB and CC are also connected in delta. The connection between A and C is connected to L1. The connection between AA and CC is connected to L2. The connection between B and C is connected to the connection between BB and CC. The remaining terminals D and DD are the connections between A and B and the connections between AA and BB, respectively.

Each delta machine voltage in FIG. 14B is VS/2. This is a double-delta half-line-voltage mode. In FIG. 14C in FIG. 14, a wye-configured machine A, B, C is connected to a second wye-configured machine AA, BB, CC by connecting coil B to coil CC at terminal D, and connecting coil C to coil BB at terminal DD. The voltage of the FIG. 14C machine is different than the voltage of the FIG. 14A machine. The voltages on coils A and AA in FIG. 14C are each one-third of (VS). Each wye machine voltage is therefore $\sqrt{3}$ (VS)/3 or (VS)/$\sqrt{3}$. This is a wye-wye 58% line voltage mode. The voltage between L1 and DD is 0.577(VS) for capacitor C1. FIG. 14D has a delta connection of coil A, B and C, and another delta connection of coils AA, BB and CC. The connection between coils A and B is connected to line L1. The connection between coils AA and BB is connected to line L2. The connections between B and C and CC and AA are connected to D. The connections between C and A and BB and CC are connected to DD. Each delta machine voltage is (VS)/$\sqrt{3}$. This is the magnitude of the voltage across each individual coil.

FIG. 15 shows how the capacitors to provide 30° lagging currents are connected for each of these modes. In every case, a first capacitor $C_{DD}$ is connected from L1 to DD, and a second capacitor $C_D$ of equal capacitance, is connected from L2 to D.

All of the modes shown in FIGS. 14 and 15 are 4-terminal circuits (L1, L2, D and DD). This invention is not restricted to only the modes shown. It is within the scope of this invention to use four or more terminals with different methods of coil connections.

As is apparent from FIGS. 4, 6, 7, 9 and 10, it is within the scope of this invention to use a 3-terminal machine and two or more power supply voltages.

It is well known to persons skilled in the art that induction machines can be used either as induction generators or induction motors. All of the circuits disclosed herein can be used for induction generators feeding power into the public utility power supply. The in-phase component of induction generator current is reversed with respect to the in-phase component of induction motor current. This is accomplished by trading the circuit connections of the windings A and B and by trading the circuit connections of the windings AA and BB in FIGS. 14 and 15.

FIG. 16 shows an application of the winding configuration of FIG. 13 to a high power three-phase motor with large power factors. Capacitors $C_1$, $C_2$, $C_3$ and $C_4$ are equal to $C_5$, $C_6$, $C_7$ and $C_8$ respectively. The switches are controlled by a load sensor. FIG. 16 will first be discussed with respect to a particular 20 horsepower motor. Full load current for this motor is $$I_F = 41.1 - j24.9 = 48.0 \angle -31.2° \text{ amperes.}$$

Two-thirds load current is $$I_2 = 27.3 - j19.2 = 33.4 \angle -35.1° \text{ amperes.}$$

Half load current is $$I_H = 20.4 - j16.4 = 26.2 \angle -38.7° \text{ amperes.}$$

One-third load current is $$I_1 = 15.6 - j14.4 = 21.2 \angle -42.7° \text{ amperes.}$$

No load current is $$I_N = 6.0 - j10.4 = 12.0 \angle -60° \text{ amperes.}$$

These current phasors are shown in FIG. 17. The dashed line is the locus of currents. $\theta$ is 31.2° lagging; $\psi$ is 35.1° lagging; $\phi$ is 42.7° lagging.

In FIG. 16, all switches will be open except those specified as being closed. At one-third load, current $I_{DN}$ equal to $I_1$ should be provided to winding DN. To accomplish this, switches $SW_1$, $SW_5$, $SW_9$, $SW_{10}$, and $SW_{11}$ are closed. The voltage across capacitor $C_1$ is $(172.5 - j99.6) = 199.2 \angle -30°$ volts. The voltage across capacitor $C_9$ is 230 volts. The sum of the currents through $C_1$, $C_9$, $C_{10}$ and $C_{11}$ is adjusted to be exactly equal to $I_1$, by the proper selection of the values of $C_1$, $C_5$, $C_9$, $C_{10}$ and $C_{11}$.

At two-thirds load, switches $SW_1$, $SW_2$, $SW_5$, $SW_6$, $SW_{10}$ and $SW_{11}$ are closed. The sum of the currents through $C_1$, $C_2$, $C_{10}$, and $C_{11}$ is adjusted to be exactly equal to $I_2$, by the proper selection of the values of $C_1$, $C_2$, $C_5$, $C_6$, $C_{10}$ and $C_{11}$.

At full load, switches $SW_1$, $SW_2$, $SW_3$, $SW_5$, $SW_6$, $SW_7$, and $SW_{11}$ are closed. The sum of the currents through $C_1$, $C_2$, $C_3$ and $C_{11}$ is adjusted to be exactly equal to $I_F$, by the proper selection of the values of $C_1$, $C_2$, $C_3$, $C_5$, $C_6$, $C_7$ and $C_{11}$.

The resolution of the currents is as follows:
At full load, $$I_{30} = 2I_F \cos(\theta + 30) = I_1 + I_2 + I_3 = 46.2 \text{ amps.}$$

$$I_{60} = 2I_F \cos(120 - \theta) = I_{11} = 2.0 \text{ amps.}$$

At two-thirds load, $$I_{30} = 2I_2 \cos(\psi + 30) = I_1 + I_2 = 28.1 \text{ amps.}$$

$$I_{60} = 2I_2 \cos(120 - \psi) = I_{10} + I_{11} = 5.9 \text{ amps.}$$

At one-third load, $$I_{30} = 2I_1 \cos(\phi + 30) = I_1 = 12.6 \text{ amps.}$$

$$I_{60} = 2I_1 \cos(120 - \phi) = I_9 + I_{11} = 9.32 \text{ amps.}$$

From these, $$I_2 = 15.5 \text{ a.}$$

$$I_3 = 18.1 \text{ a.}$$

$$I_{10} = 3.9 \text{ a.}$$

$$I_9 = 3.4 \text{ a.}$$

If the one-third load adjsstment is used at no load, $I_{DN}$ is too large by 9 amperes. If $SW_1$ is opened at no load, leaving $SW_9$, $SW_{10}$ and $SW_{11}$ closed, $I_{DN}$ will be too small by 2.7 amperes.

The control algorithm just discussed is suitable for motors whose full load phase angle is 30 degrees or more lagging. No transformer is needed and $C_4$ and $C_8$ may be omitted. This is true of most 1800 rpm and 1200 rpm motors. Some 3600 rpm motors in the five to twenty horsepower range have full load current angles of less than thirty degrees lag. For these, the transformers in FIG. 16 may be used to supply $C_4$ and $C_8$. At full load, only $SW_4$ and $SW_8$ are closed. At three-fourths load, only $SW_1$, $SW_2$, $SW_3$, $SW_5$, $SW_6$, $SW_7$ and $SW_{11}$ are closed. At half load, $SW_1$, $SW_2$, $SW_5$, $SW_6$, $SW_{10}$ and $SW_{11}$ are closed. At one-fourth load, $SW_1$, $SW_5$, $SW_9$, $SW_{10}$ and $SW_{11}$ are closed. At no load, only $SW_9$, $SW_{10}$ and $SW_{11}$ are closed.

Often the motor manufacturer is unable to provide the user with all of the current values shown in FIG. 17. When only a few current values are known, linear interpolation can be used to fill in the unknown values. When only $I_F$, $I_H$, and $I_N$ are known, $I_1$ and $I_2$ can be aproximated by $$I_2 = (2I_H + I_F)/3$$

$$I_1 = (2I_H + I_N)/3.$$

I claim:

1. A three-phase induction machine with at least four different machine terminals, said machine having 6 windings comprising two sets of three windings with each pair of windings from each set disposed together to have voltages in phase, and with each pair of windings spaced 120 electrical degrees from another, each set being connected in a symmetrical configuration to provide three set terminals in each configuration, one of the said set terminals in a first set being directly connected to one of said set terminals in the other set, whereby said 6 windings have said four terminals remaining which are said maching terminals, one set having first and fourth terminals and the other set having second and third machine terminals, a two-terminal single-phase supply, the first of said machine terminals being connected to the first of said machine terminals being connected to the first terminal of said single-phase supply, the second of said machine terminals being connected to the second terminal of said single-phase supply, and a first capacitor connected between the third machine terminal and said first terminal of said single-phase supply to substantially produce three different phases of currents in said windings with said single-phase supply.

2. A machine as in claim 1 including a second capacitor connected between said second and said fourth machine terminals.

3. A machine as in claim 2, including a third capacitor connected between said third and said fourth machine terminals.

4. An induction machine as in claim 1 which is an induction motor.

5. An induction machine as in claim 2 which is an induction motor.

6. An induction machine as in claim 3 which is an induction motor.

7. An induction motor as in claim 4 wherein each said symmetrical configuration is a wye connection of three of said windings.

8. An induction motor as in claim 5 wherein each said symmetrical configuration is a wye connection of three of said windings.

9. An induction motor as in claim 6 wherein each said symmetrical configuration is a wye connection of three of said windings.

10. An induction motor as in claim 4 wherein each said symmetrical configuration is a delta connection of three of said windings.

11. An induction motor as in claim 5 wherein each said symmetrical configuration is a delta connection of three of said windings.

12. An induction motor as in claim 6 wherein each said symmetrical configuration is a delta connection of three of said windings.

13. An induction motor as in claim 4 wherein a second capacitor is connected in series with an electrically-controlled switch, said series combination of said second capacitor and said switch being connected between the said third machine terminal and said first terminal of said single-phase supply, means responsive to the current in the said seoond machine terminal to produce a control signal, said electrically-controlled switch being responsive to said control signal.

14. An induction motor as in claim 4 wherein a second capacitor is connected in series with an electrically-controlled switch, said series combination of said second capacitor and said switch being connected between the said third machie terminal and said first terminal of said single-phase supply, means responsive to the voltage on said third machine terminal to produce a control signal, said electrically-controlled switch being responsive to said control signal.

15. A three-phase motor with three motor terminals, a three-wire single-phase power supply with one intermediate voltage terminal and two maximum voltage terminals, the first of said motor terminals being connected to the first of said maximum voltage supply terminals, the second of said motor terminals being connected to the said intermediate voltage supply terminal, and a capacitor connected between the third of said machine terminals and the second of said maximum voltage supply terminals.

16. A motor as in claim 15, including a second capacitor connected between said second motor terminal and said third motor terminal, said second capacitor being continuously connected during motor operation.

17. A motor as in claim 15, including a circuit comprising a second capacitor in series with a controllable switch, said circuit connected between said third machine terminal and said second of said maximum voltage supply terminals.

18. A motor as in claim 17, including sensor means responsive to the current in said first of said motor terminals, and means to control said switch responsive to said sensor means.

19. A motor as in claim 17, including sensor means responsive to the voltage on said third machine terminal to generate a control signal, and means to control said switch responsive to said control signal.

20. A power supply for a three-phase induction motor comprising a two-terminal single-phase power supply, transformer means to generate a third voltage, two of the three terminals of the said three-phase motor being connected to the two terminals of the said power supply respectively, electronically-adjustable capacitance means connected between said third voltage and the third terminal of said motor to provide a capacitance current flowing into said third terminal, first voltage measurement means responsive to the voltage of said power supply and delivering a reference signal, second voltage measurement means responsive to the voltage of said third terminal and delivering a measurement signal, subtraction means responsive to said measurement signal and said reference signal to provide an error signal, said adjustable capacitance means being responsive to said error signal.

21. An induction motor as in claim 4, including a transformer with primary winding connected between the said two terminals of the single-phase supply, a secondary winding of said transformer connected between one terminal of said supply and one terminal of a second capacitor, and conduction means for the other terminal of said second capacitor to be conductively connected to said third machine terminal.

22. An induction motor as in claim 21, including sensor means responsive to the current in said first of said machine terminals to produce a control signal, and said conduction means being responsive to said control signal.

23. A three-phase induction motor with at least four different motor terminals, said motor having 6 windings comprising two sets of three windings with pairs of windings from each set disposed together in common motor slots, and with each pair of windings spaced 120 electrical degrees from another, each set being connected in a wye configuration to provide three terminals at the other end of said wye, one of said pairs of windings being directly connected together at their terminals, whereby said 6 windings have said four terminals remaining which are said motor terminals, one set having first and fourth motor terminals and the other set second and third motor terminals, a two-terminal single phase supply, the first of said motor terminals being connected to the first terminal of said single-phase supply, the second of said motor terminals being connected to the second terminal of said single-phase supply, a first capacitor connected between the third motor terminal and said first terminal of said single-phase supply to substantially produce three different phases of currents in said windings with said single-phase supply.

24. A motor as in claim 23 including a second capacitor connected between said second and fourth motor terminals, said second capacitor being equal in capacitance value to said first capacitor.

25. A motor as in claim 24 including a third capacitor connected between said third and fourth motor terminals.

26. An induction machine as in claim 2 including a shaft of said machine adapted to be connected to a prime mover whereby said machine is an induction generator.

27. An induction machine as in claim 3 including a shaft of said machine adapted to be connected to a prime mover whereby said machine is an induction generator.

28. A three-phase power supply for a three-phase motor comprising three output terminals and three input terminals, a single-phase power supply comprising a first voltage line, a second voltage line and an intermediate voltage line, said first voltage line connected to a first one of said input terminals, said second voltage line connected to a second one of said input terminals, said intermediate voltage line connected to a third one of said input terminals, said first input terminal connected to a first output terminal, said third input terminal connected to a second output terminal, a first capacitor connected between said second input termina and a third output terminal, and a second capacitor connected directly between said third input terminal and said third output terminal, said second capacitor remaining connected permanently during running conditions of said three-phase motor.

29. A power supply as in claim 28, including a third capacitor in series with an electrical switch with open and closed states, said series combination connected between said second input terminal and said third output terminal.

30. A power supply as in claim 29, including a motor current sensor, said state of said switch responsive to said sensor.

31. A power supply as in claim 30, wherein said motor current sensor is sensing the current in said first output terminal.

32. A power supply as in claim 28, including a third capacitor connected in series with a starting switch with open and closed states, said series combination connected between said third input terminal and said third output terminal.

33. A power supply as in claim 32, wherein said starting switch is closed to accelerate said motor, and said starting switch is open during normal running conditions of said motor.

34. A power supply as in claim 32, wherein said state of said starting switch is controlled by a short-time timer.

35. A power supply as in claim 32, including a motor current sensor, wherein said starting switch state is responsive to said sensor.

36. A power supply as in claim 32, including a sensor responsive to the shaft speed of said motor, wherein said state is responsive to said sensor.

37. A power supply as in claim 2 wherein the voltage drop across said first capacitor from said first to third machine terminals lags by 30° the voltage drop from said first to said second machine terminals.

38. A power supply as in claim 37 wherein the voltage drop across said second capacitor from said second to said fourth machine terminals lags by 30° the voltage drop from said second to said first machine terminal.

39. A three-phase induction motor with at least four different motor terminals, said motor having 6 windings comprising two sets of three windings with pairs of windings from each set disposed together in common motor slots, and with each pair of windings spaced 120 electrical degrees from another, each set being connected in a wye configuration to provide three terminals at the other end of said wye, two of said pairs of winding being directly connected together at their terminals, whereby said 6 windings have said four terminals remaining which are said motor terminals, said connected windings having third and fourth motor terminals and said remaining windings having first and second terminals, a two-terminal single phase supply, the first of said motor terminals being connected to the first terminal of said single-phase supply, the second of said motor terminals being connected to the second terminal of said single-phase supply and a first capacitor connected between the third motor terminal and one terminal of said single-phase supply to substantially produce three different phases of currents in said windings with said single-phase supply.

40. An induction motor as in claim 39 including a second capacitor connected between said fourth motor terminal and the other terminal of said single-phase supply.

41. A three-phase induction motor with at least four different motor terminals, said motor having 6 windings comprising two sets of three windings with pairs of windings from each set disposed together in common motor slots, and with each pair of windings spaced 120 electrical degrees from another, each set being connected in a delta configuration to provide three terminals, one of said terminals of one set being connected to one of said treminals of said other set, whereby said 6 windings have said four terminals remaining which are said motor terminals, the remaining terminals of one set having first and fourth motor terminals and the remaining terminals of the other set having second and third motor terminals, a two-terminal single phase supply, the first of said motor terminals being connected to the first terminal of said single-phase supply, the second of said motor terminals being connected to the second terminal of said single-phase supply and a first capacitor connected between the third motor terminal and one terminal of said single-phase supply to substantially produce three different phases of currents in said windings with said single-phase supply.

42. An induction motor as in claim 41 including a second capacitor connected between said fourth motor terminal and the other terminal of said single-phase supply.

43. A three-phase induction motor with at least four different motor terminals, said motor having 6 windings comprising two sets of three windings with pairs of windings from each set disposed together in common motor slots, and with each pair of windings spaced 120 electrical degrees from another, each set being conncected in a delta configuration to provide three terminals at the vertices of said delta, one of said pairs of windings being connected together in parallel at their terminals, whereby said 6 windings have said four terminals remaining which are said motor terminals, said windings in parallel having third and fourth motor terminals and the remaining windings having first and second motor terminals, a two-terminal single phase supply, the first of said motor terminals being connected to the first terminal of said single-phase supply, the second of said motor terminals being connected to the second terminal of said single-phase supply, and a first capacitor connected between the third motor terminal and one terminal of said single-phase supply to substantially produce three different phases of currents in said windings with said single-phase supply.

44. An induction motor as in claim 43 including a second capacitor connected between said fourth motor terminal and the other terminal of said single-phase supply.

* * * * *

UNITED STATES PATENT AND TRADEMARK OFFICE
CERTIFICATE OF CORRECTION

PATENT NO. : 4,792,740
DATED : December 20, 1988
INVENTOR(S) : Otto J. M. Smith

It is certified that error appears in the above-identified patent and that said Letters Patent is hereby corrected as shown below:

Column 1, line 32: change "facto" to --factor--.

Column 2, line 35: change "terminass" to --terminals--.
          line 44: change "th" to --the--.
          line 53: change "aee" to --are--.

Column 4, line 23: change "plle" to --pole--.

Column 11, line 33: change "conrributes" to --contributes--.

Column 16, line 2: change "machining" to --machine--.
           line 6: delete entire line.
           line 52: change "seeond" to --second--.
           line 59: change "machie" to --machine--.

Column 18, line 32: change "termina" to --terminal--.

Signed and Sealed this

Twenty-eighth Day of April, 1992

*Attest:*

HARRY F. MANBECK, JR.

*Attesting Officer*     *Commissioner of Patents and Trademarks*